June 2, 1931.  R. C. SCHEMMEL  1,808,259
FENDER WELT AND METHOD OF MAKING THE SAME
Filed Sept. 18, 1930
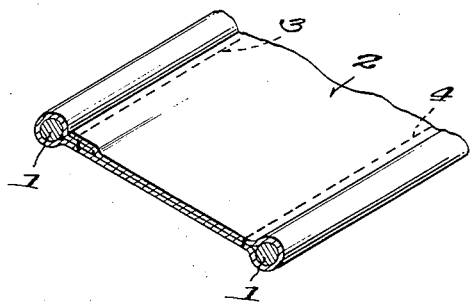
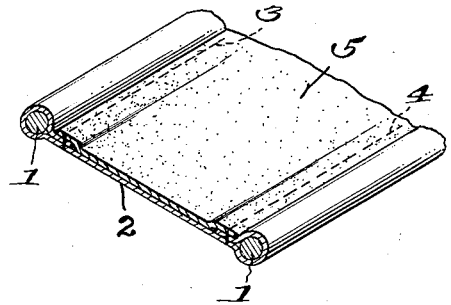
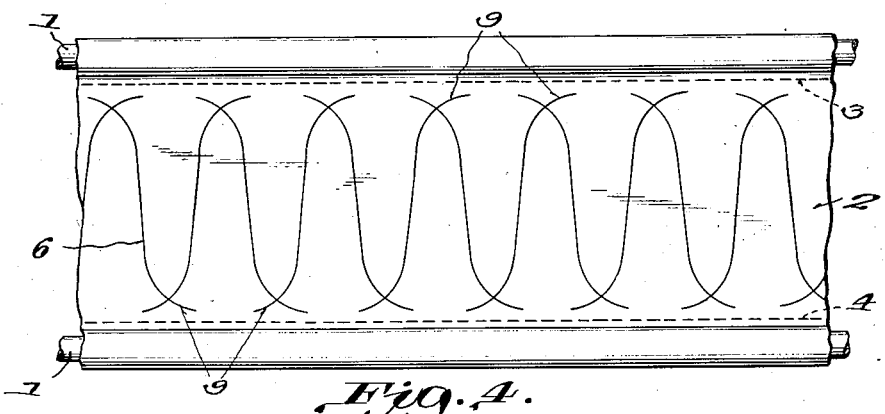
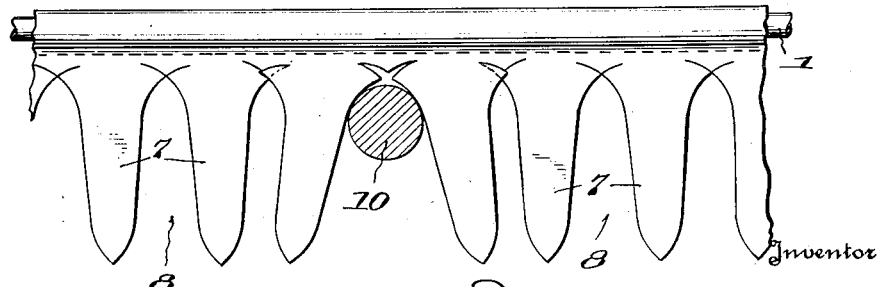
Inventor
Robert C. Schemmel
By Dyre & Kirchner
Attorneys Patented June 2, 1931

1,808,259

UNITED STATES PATENT OFFICE

ROBERT C. SCHEMMEL, OF UNION CITY, INDIANA

FENDER WELT AND METHOD OF MAKING THE SAME

Application filed September 18, 1930. Serial No. 482,816.

My present invention relates to fender welts, i. e., strips of fabric or like material adapted to be interposed between the contacting portions of the body and fenders of an automobile to cushion the engagement of the parts and prevent objectionable squeaks and rattle.

Welts designed for this purpose commonly comprise a beaded portion and a flange portion, the beaded portion being in a practical installation placed uppermost of the flanged portion close to the joint formed by the body material and the fender, and the flanged portion being interposed between a portion of the otherwise contacting areas of the body material and the fender, in a manner well understood by body builders.

Welts of this character are best made in strips of indefinite length which are marketed in rolls. From the rolls pieces of proper length are cut by the automobile manufacturer as and when required in the assembling of the body and fender.

Since the fenders are secured to the body by means of bolts which extend through the area in which the welt is positioned, it is necessary that apertures for these bolts be formed in the flange portion of the welt. Because the length of welt required varies as between different body models, and even as between the front and rear fenders of the same model, the welt for which is conveniently taken from the same roll, and because there is a certain varying amount of welt wasted by trimming off of the length applied to each fender, it is impossible to preform in the welt during its manufacture special holes at precisely the locations where these bolts will be encountered. To obviate the necessity of punching such holes in the flange portion at the locations of these bolts during the operation of installing the welt, it has been proposed to form the flange with a plurality of distinct tongues which may readily be displaced to permit passage of a bolt between any pair of adjacent tongues. My present invention consists of an improvement in this type of tongued fender welt and the method of making the same.

One object of the invention is to provide a fender welt of the character indicated in which the tongues are appreciably weakened at their point of connection with the beaded portion of the welt to facilitate flexure thereof for the purpose of avoiding bolts, as has been described.

Another object is to provide a fender welt of the type indicated which combines two different kinds of covering material, utilizing the physical characteristics of each type to best advantage and achieving substantial economies over welts of the prior art made from a single covering material. More specifically, my invention contemplates employing a highly finished and relatively hard surfaced covering material in the exposed bead portion of the welt, with which is combined a more yielding material in the flange portion. The latter material is much less costly than the former, and its use, to the extent that it replaces the hard surfaced covering, results in a product which is at once more efficient and more economical of manufacture.

A further object of the invention is to provide a fender welt having a tongued flange in which the tongues are formed of plies of material substantially coextensive with the length of the flange, thus eliminating certain objectionable features of welts of the prior art, as will be explained hereinafter in detail.

A further object is to provide a fender welt and a method of making the same which will exhibit certain advantages of function, durability, ease of installation and cost of manufacture not known prior to my invention, which advantages will be more evident from the detailed description hereinafter.

The invention, which will be hereinafter particularly pointed out in the appended claims, will now be explained in terms of certain preferred forms of embodiment specifically illustrated in the accompanying drawings.

In the drawings, which form part of this application for letters patent, and in which the same reference character is used to indicate the same part in the several views, Figure 1 is a perspective view with one end in section of one type of blank from which the final product is formed;

Fig. 2 is a similar view of a modified type of blank;

Fig. 3 is a plan view of a blank immediately after practice of the severing operation; and Fig. 4 is a plan view of the final product, showing its manner of cooperation in an installation with a fender bolt.

Referring now to the drawings, reference numeral 1 designates a filler element, of cord, twisted paper, rubber or similar flexible material. A pair of these filler elements 1 are associated in spaced parallel relation against a strip of flexible material 2, which may be leather, textile fabric or analogous flexible material. I prefer to employ leatherized or rubberized textile fabric such as is commonly used for welt covers.

In the manufacture of the welt blank shown in Fig. 1, one edge of the covering material 2 is folded over one of the fillers 1 positioned close to said edge, so that the edge of the material 2 lies closely adjacent to the filler. The other filler 1 is positioned against the welt covering material 2 along a line thereof spaced inwardly from its opposite edge, and this edge is then folded over the second filler 1 to extend in overlapped relation with the first edge of the covering material. It will thus be appreciated that the resulting structure comprises a blank having a pair of beaded edge portions which contain a filler 1 and an intermediate web containing two plies of the covering material, the line of juncture of the two edges of the covering material being located closely adjacent to one of the beads.

A line of stitching 3 is run through the lap joint formed by the edges of the covering material and a similar line of stitching 4 is passed through the two plies of covering material close to the opposite bead. One function of the two lines of stitching is to maintain the fillers 1 securely in their respective beads.

A coating of cement is preferably interposed between the contacting plies of covering material in the webbing between the beads.

In the manufacture of the modified type of blank shown in Fig. 2, a narrower strip of covering fabric 2 is employed. According to this modification each of the fillers 1 is positioned relatively closely to the longitudinal edges of the covering material and these edges are then folded over to enclose each of the fillers. A layer of adhesive is preferably spread over the area of the covering material between the edge beads, and a strip of different material 5 is united to the coated area of the covering material 2.

The material 5 preferably consists of a material which is cheaper and more yielding than the covering material 2. Specifically the material 5 may be waterproof paper, i. e., a relatively heavy grade of paper impregnated or coated with a water proofing finish. It will be appreciated that the use of the strip 5 in combination with the covering material 2 according to the modification shown in Fig. 2 results in a saving of the higher priced hard finished textile fabric 2 and provides an area in the web between the edge beads having superior yielding characteristics achieving thereby an increased cushioning function.

The blank formed as described in connection with Fig. 1 or Fig. 2 is next severed along an irregular line 6 as shown in Fig. 3. This line 6 is preferably a series of reverse curves, to produce from the welt blank a pair of identical welts as shown in Fig. 4, each having a filled bead and an adjacent flange portion configured with a plurality of complementary tongues 7 and recesses 8.

In forming the line of cut 6 I prefer to extend the line of each curve adjacent the edge bead of the welt blank to intersect a similar line extended from the adjacent curve, to provide at the base of each tongue 7 a pair of inwardly directed slits 9. These slits serve to weaken the point of connection between each tongue of the blank and the beaded portion of the welt, for a purpose which will now be explained.

The welt is applied as has been explained hereinabove by placing the beaded portion thereof uppermost of the blank portion close to the joint formed by the body material of the automobile and its fender, the flange portion being interposed between a portion of the otherwise contacting areas of the body material and the fender. The tongues 7 of the flange portion by reason of their weakened bases formed by the slits 9 may be readily displaced laterally, i. e., in the plane of the flange, to avoid bolts 10 used in securing the fender to the body, regardless of the precise location of these bolts.

By forming the lap joint of the meeting edges of the covering material 2 and the flange material 5 closely adjacent to one of the beads containing the filler 1, the resulting welt, as shown in Fig. 4, is provided with a double ply tongued flange in which each of the plies is coextensive with the width of the flange. In other words, each tongue is formed throughout its entire length of as many materials as there are plies in the flange, so that there is between the stitching at the base of the flange and the free end of the tongues no break or joint in any of the plies. This construction results in the formation of tongues of great durability, preventing breaking off and loss of a portion thereof, so that the tongues remain during the installing operation and afterwards of constant and uniform thickness through their entire length, to achieve a superior cushioning effect.

It is to be understood that I have shown and described the present invention in certain preferred forms of embodiment only, merely by way of exemplification. Other and further modifications will suggest themselves to persons skilled in the art, but all such modifications, to the extent that they embody the principles of the invention pointed out in the appended claims are to be deemed within the scope and purview thereof.

Having thus described my present invention what I claim and desire to secure by Letters Patent is:

1. The method of making a fender welt which comprises enclosing a pair of fillers in spaced relation in a strip of covering material, sewing the material along lines closely adjacent each of the fillers, severing the blank thus formed along an irregular line of cut to form two welts each having a bead and a tongued flange, and slitting each of said tongues inwardly close to said line of stitching to provide a weakened flexing connection.

2. A fender welt comprising a filler, a flexible covering therefor extending from one side of the filler to form a flange, said flange consisting of a plurality of flexible tongues and each of said tongues being slitted at its end adjacent said filler whereby the connection between said tongue and the filler enclosing portion of the fabric is weakened to facilitate flexure of the tongue.

3. A fender welt comprising a filler, a flexible covering looped around said filler and extending from one side thereof in two plies of equal length to form a flange, said flange consisting of a plurality of flexible tongues, each of said tongues being slitted at its end adjacent said filler whereby the connection between said tongue and the filler enclosing portion of the covering is weakened to facilitate flexure of the tongue.

4. The method of making fender welts which comprises associating with a covering strip a pair of spaced fillers, folding each margin of the covering strip over one of the fillers, disposing the edges of the strip in meeting relation along a line adjacent one of the fillers, securing said edges together in a joint along said line, and then severing the blank thus formed along an irregular line of cut to form two complementary welts each having a bead and a flange provided with a plurality of multi-ply tongues, each ply of each tongue comprising a single continuous piece of the covering material.

5. The method of making fender welts which comprises associating with a covering strip a pair of spaced fillers, folding each margin of the covering strip over one of the fillers, overlapping the edges of the strip along a line adjacent one of the fillers, securing said edges together in a lap joint along said line, and then severing the blank thus formed along an irregular line of cut to form two complementary welts each having a bead and a flange provided with a plurality of multi-ply tongues, each ply of each tongue comprising a single continuous piece of the covering material.

6. The method of making fender welts which comprises associating with a covering strip a pair of spaced fillers, folding each margin of the covering strip over one of the fillers, disposing the edges of the strip in overlapping relation along a line adjacent one of the fillers, stitching said edges together in a lap joint along said line, and then severing the blank thus formed along an irregular line of cut to form two complementary welts each having a bead and a flange provided with a plurality of multi-ply tongues, each ply of each tongue comprising a single continuous piece of the covering material.

In testimony whereof I affix my signature.

ROBERT C. SCHEMMEL.